AXIALLY ADJUSTABLE DRIVE MECHANISM

Filed Sept. 25, 1961 6 Sheets-Sheet 1

VITO RASO
ROBERT P. THOMPSON
INVENTORS.

BY Flam and Flam
ATTORNEYS.

June 23, 1964 V. RASO ETAL 3,138,032

AXIALLY ADJUSTABLE DRIVE MECHANISM

Filed Sept. 25, 1961 6 Sheets-Sheet 2

VITO RASO
ROBERT P. THOMPSON
INVENTORS.

BY Flam and Flam

ATTORNEYS.

VITO RASO
ROBERT P. THOMPSON
INVENTORS.

BY Flam and Flam
ATTORNEYS.

June 23, 1964 V. RASO ET AL 3,138,032

AXIALLY ADJUSTABLE DRIVE MECHANISM

Filed Sept. 25, 1961 6 Sheets-Sheet 4

VITO RASO
ROBERT P. THOMPSON
INVENTOR.

BY Flam and Flam

ATTORNEYS.

AXIALLY ADJUSTABLE DRIVE MECHANISM

Filed Sept. 25, 1961 6 Sheets-Sheet 5

VITO RASO
ROBERT P. THOMPSON
INVENTOR.

BY Flam and Flam

ATTORNEYS.

AXIALLY ADJUSTABLE DRIVE MECHANISM

Filed Sept. 25, 1961 6 Sheets-Sheet 6

VITO RASO
ROBERT P. THOMPSON
INVENTOR.

BY Flam and Flam

ATTORNEYS.

3,138,032
AXIALLY ADJUSTABLE DRIVE MECHANISM

Vito Raso, Buena Park, and Robert Paul Thompson, Lawndale, Calif., assignors, by mesne assignments, to Emerson Electric Co., a corporation of Missouri Filed Sept. 25, 1961, Ser. No. 140,520
7 Claims. (Cl. 74—230.17)

This invention relates to mechanism for transmitting motion, and incorporating a sliding element.

Such a structure, utilized in connection with adjustable pulleys, is described in an application filed in the name of Frederick O. Luenberger on June 12, 1961, under Serial No. 116,531, and assigned to the same assignee as this application.

The utility of the structure, however, is not restricted to pulley devices, but is useful wherever there is axial movement between a hub or the like and a shaft on which it is mounted. In said copending application, in order to obviate lubrication, a bushing is interposed between the hub and the shaft, said bushing being made of a plastic material having a low coefficient of friction between it and metal. An example of such plastic material is Delrin or Nylatron, which has a nylon base including molybdenum disulphide.

By this means, the necessity for any substantial lubrication is obviated; and in order to reduce the likelihood of injurious corrosion, the metal parts in contact with the bushing may be made of stainless steel or chrome-plated or both.

It is one of the objects of this invention to improve in general structures of this character.

In many instances, the shaft and the hub are keyed or splined so that one may drive the other. It is another object of this invention to provide an improved keying structure.

This invention possesses many other advantages and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIGURE 1 is a longitudinal sectional view of an adjustable pulley structure embodying the invention;

FIGS. 2 and 3 are sectional views, taken along planes corresponding to lines 2—2 and 3—3 of FIG. 1;

Figure 1:
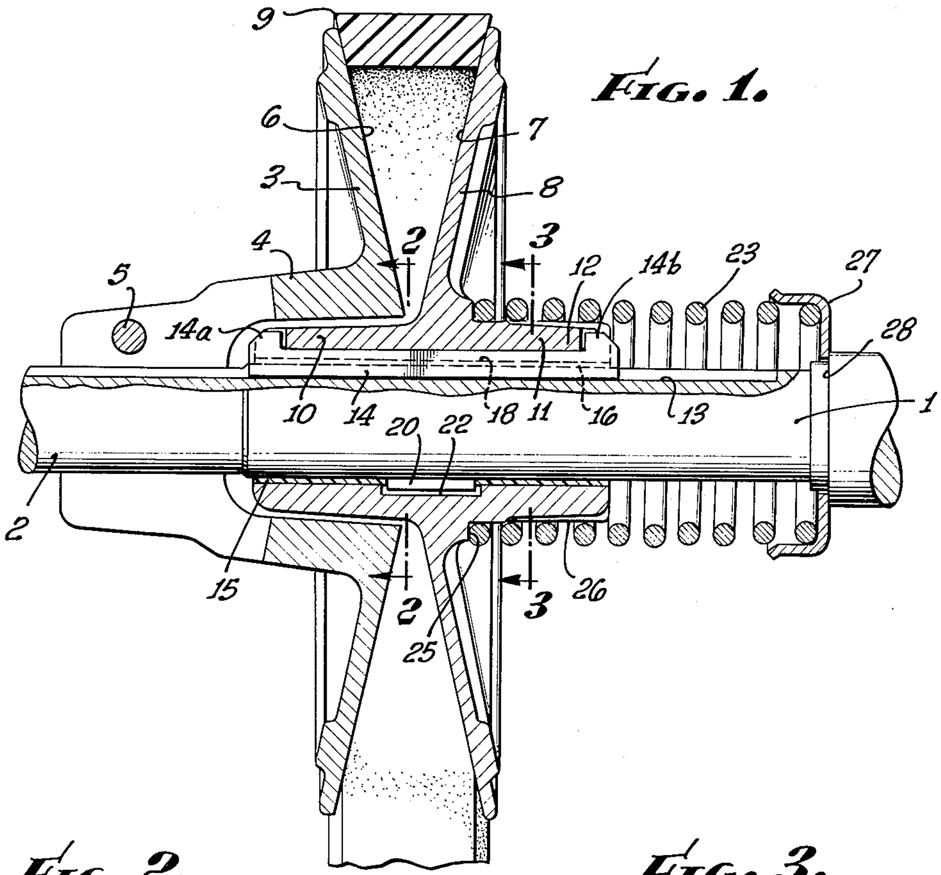
Figure 2:
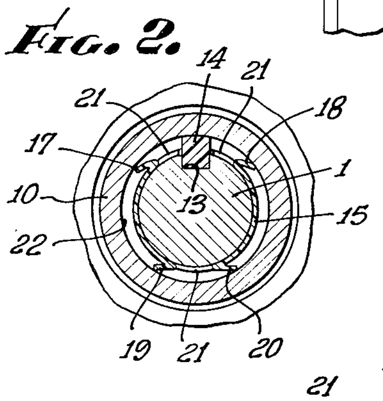
Figure 3:
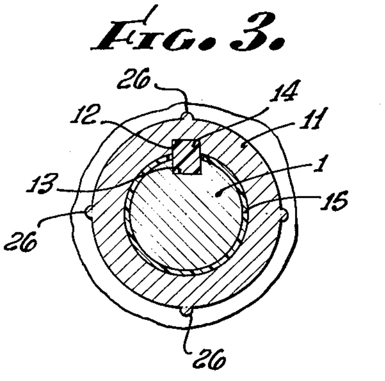
Figures 8, 9, 10:
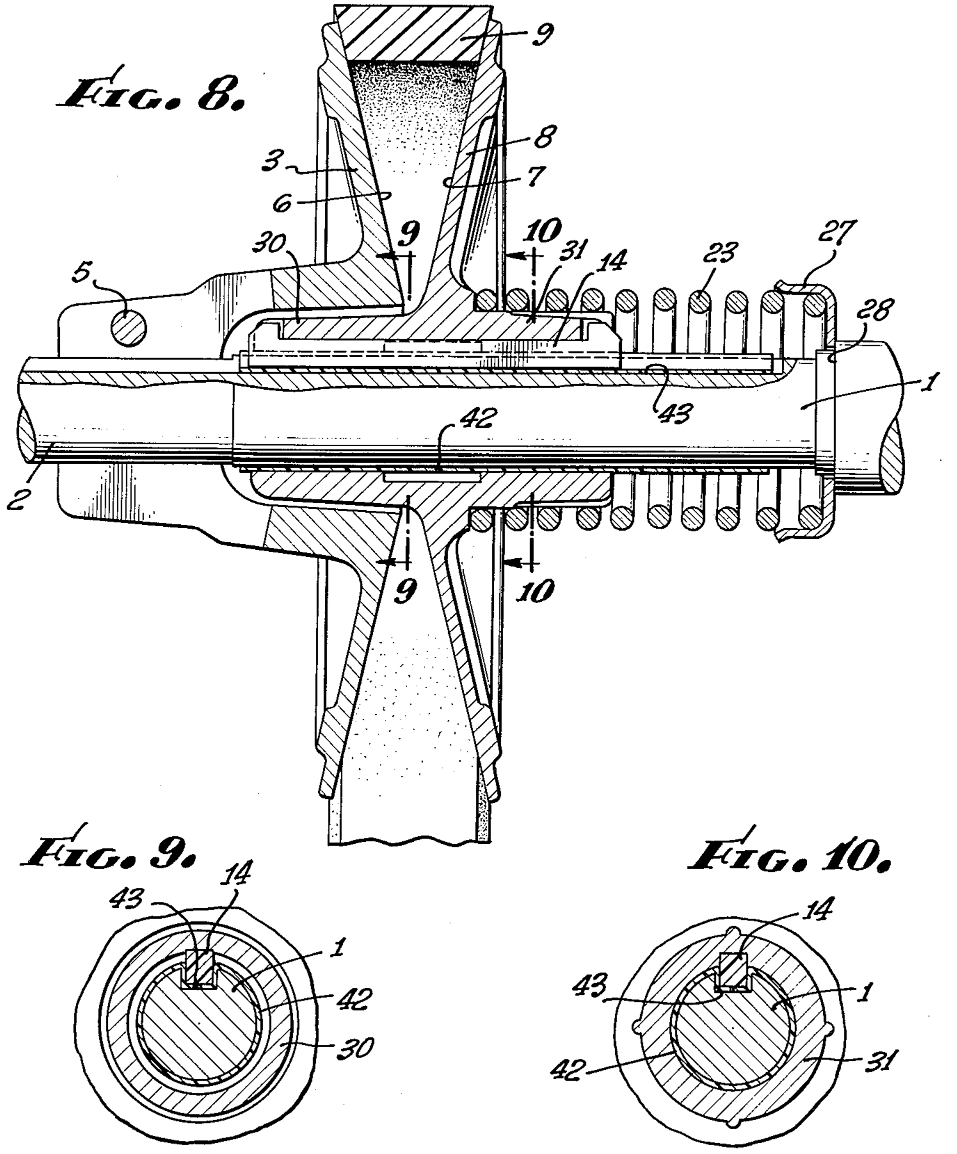
FIG. 8 is a view similar to FIG. 1 of a further modified form of the invention.
Figure 11:
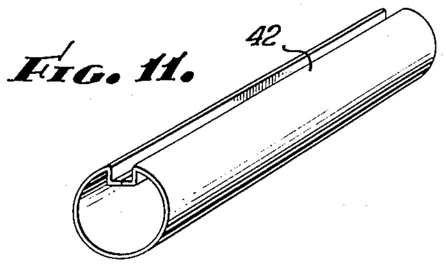
Figure 12:
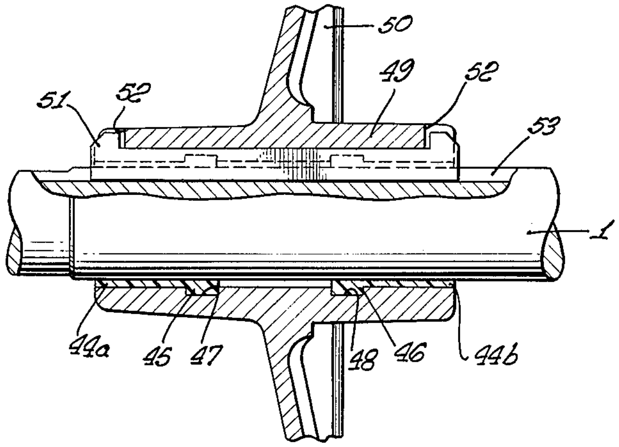
Figure 13:
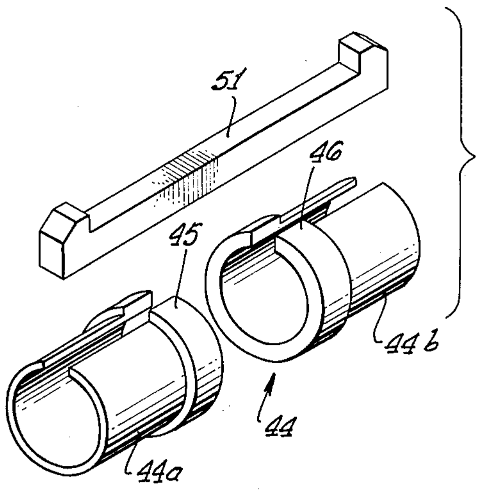
Figure 14:
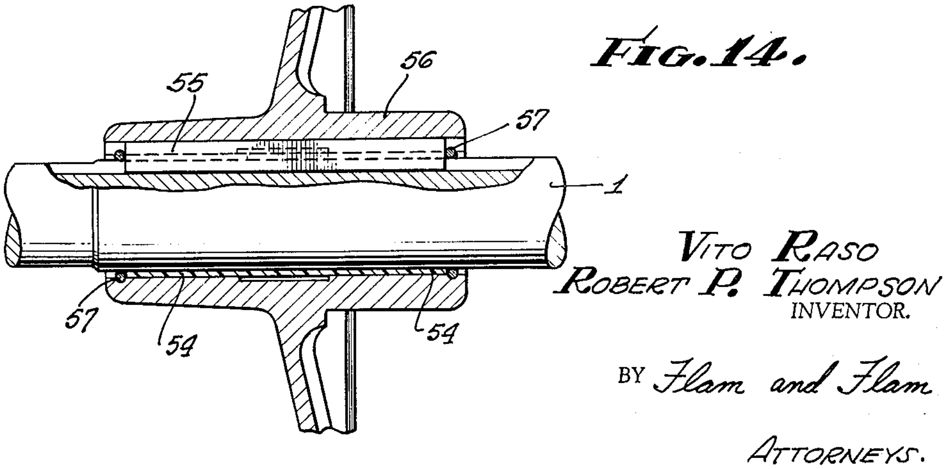
Figure 15:
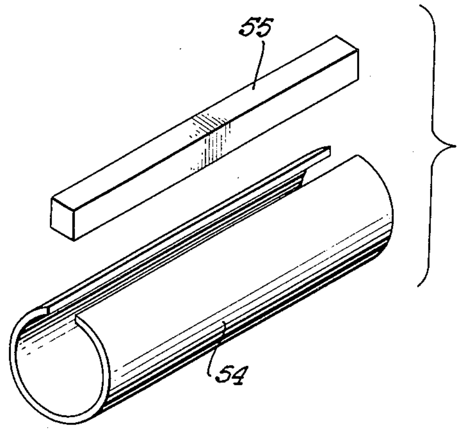
Figure 16:
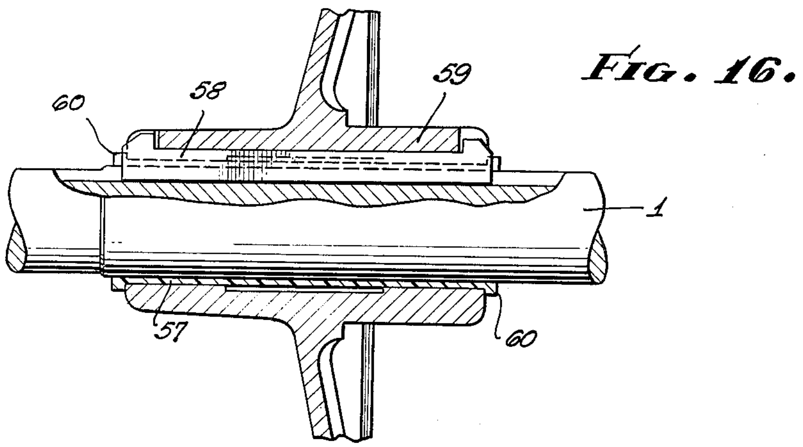
Figure 17:
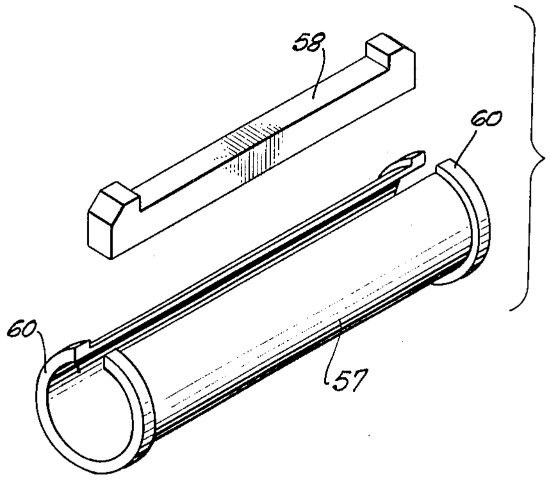
Figure 18:
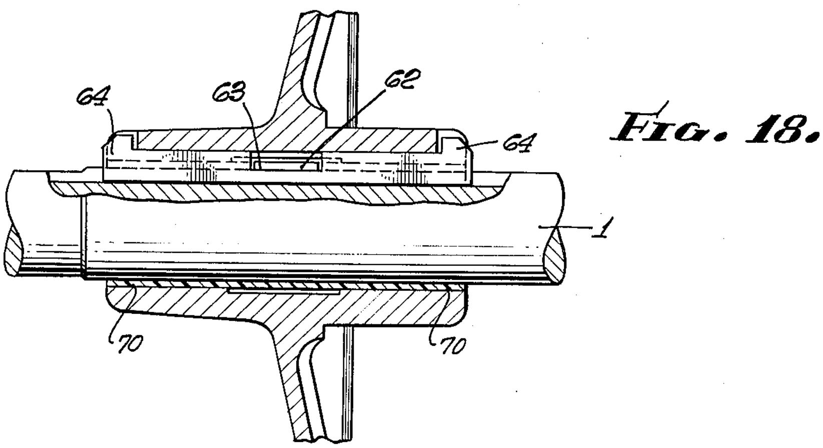
Figures 19, 20, 21:
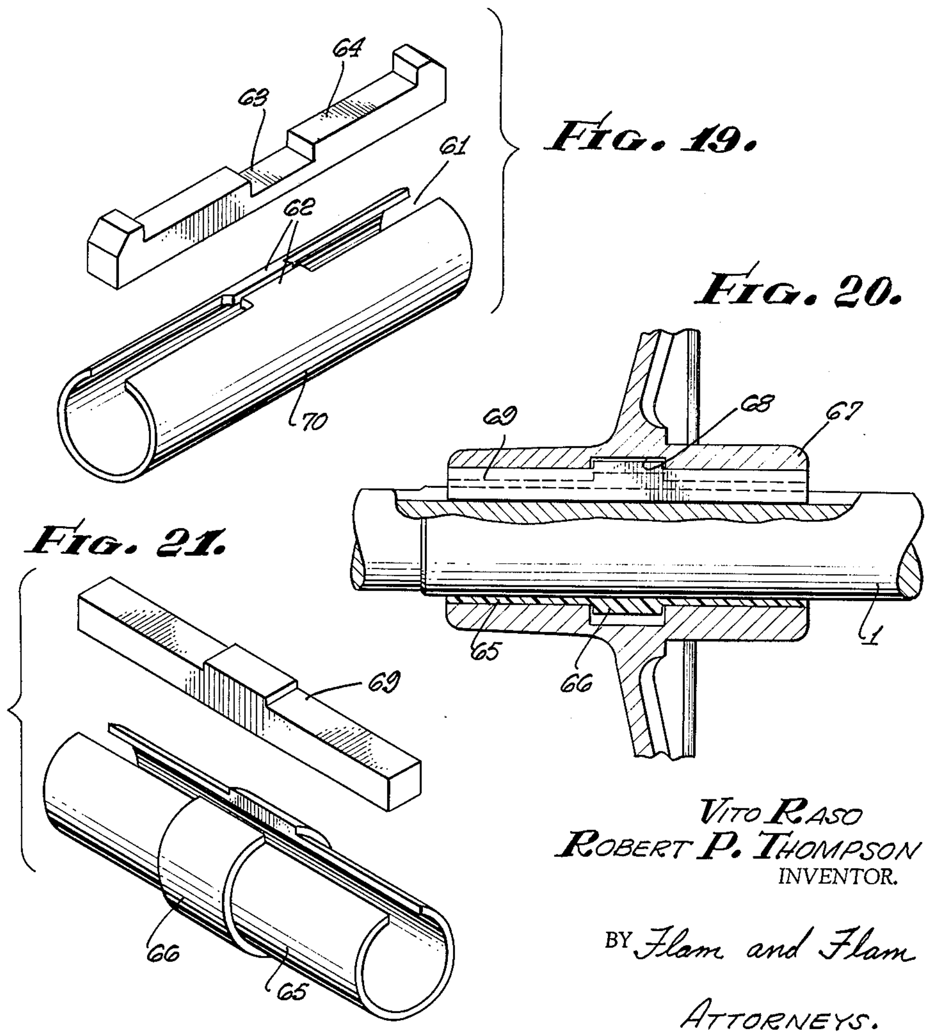

FIGS. 9 and 10 are sectional views, taken along planes corresponding to lines 9—9 and 10—10 of FIG. 8;

FIG. 11 is a pictorial view of a bushing structure utilized in the form of the invention shown in FIG. 8;

FIG. 12 is a view similar to FIG. 1, of a further modified form of the invention;

FIG. 13 is a pictorial view of a bushing structure and the cooperating key utilized in the form shown in FIG. 12;

FIG. 14 is a view similar to FIG. 1, of a further modified form of the invention;

FIG. 15 is a pictorial view of a bushing structure and the cooperating key utilized in the form shown in FIG. 14;

FIG. 16 is a view similar to FIG. 1, of a further modified form of the invention;

FIG. 17 is a pictorial view of a bushing structure and the cooperating key utilized in the form shown in FIG. 16;

FIG. 18 is a view similar to FIG. 1, of a further modified form of the invention;

FIG. 19 is a pictorial view of a bushing structure and the cooperating key utilized in the form shown in FIG. 18;

FIG. 20 is a view similar to FIG. 1, of a further modified form of the invention; and FIG. 21 is a pictorial view of a bushing structure and the cooperating key utilized in the form shown in FIG. 20.

In the form of the invention illustrated in FIGS. 1 to 4 inclusive, a shaft 1 is shown as provided at its left-hand extremity with a reduced portion 2. A pulley section 3 is mounted on the shaft portion 2. For this purpose, the hub 4 of the section 3 is split and a fastening means, such as that indicated by bolt 5, is utilized to clamp the hub 3 upon the shaft 2.

The section 3 has an active conical surface 6 opposing the conical surface 7 of an adjustable pulley section 8. The conical surfaces 6 and 7 cooperate with the edges of an edge-active belt 9.

As is well known in this type of construction, the adjustment of the pulley section 8 longitudinally of the axis of the shaft 1 causes the belt 9 to engage at different portions of the conical surfaces 6 and 7. In the position shown in FIG. 1, for example, the pulley sections 3 and 8 are closest together, and accordingly the belt 9 is at its maximum radial position with respect to the shaft axis. The effective diameter is thus a maximum.

When it is desired to reduce the effective diameter of the pulley structure, the section 8 is moved toward the right, the belt 9 moving radially inwardly of the axis of the shaft 1.

The pulley section 8 has oppositely directed hubs 10 and 11. Longitudinally extending through the hub structure 10–11 is a keyway 12, by the aid of which a sliding connection may be established between the pulley section 8 and the shaft 1. Attached in the keyway 12 and also engaging the keyway 13 of the shaft 1 is a key 14. This key 14 is preferably made of a plastic material such as Nylatron, which has a low coefficient of friction with respect to the metal part that it engages. Nylatron is a nylon compound incorporating molybdenum disulphide.

Key 14 is prevented from sliding relatively to section 8 by the aid of the heads **14*a*, 14*b*** at opposite ends of the key.

Figure 4:
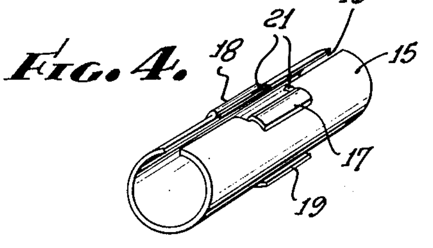
FIG. 4 is a pictorial view of a bushing utilized in the invention.

Located between the hub structure 10–11 and a shaft 1 is a bushing 15, shown to best advantage in FIG. 4. This bushing 15 has a longitudinal spilt 16, wide enough to permit the passage of the key 14 inwardly to extend in keyway 13. This split 16 extends from end to end of the bushing 15.

In order to cause the bushing 15 to move simultaneously with the pulley section 8, lips 17, 18, 19, and 20 are formed at an intermediate portion of the bushing 15. These lips are turned outwardly and along the periphery of the bushing 15. In order to provide lips or extensions, spaced cuts such as 21 are made adjacent the edges of the split 16. Similar cuts may be employed at a location diametrically opposite the location of the projections 17 and 18 to form the lips or projections 19 and 20. These projections, 17 to 20 inclusive, extend into an enlarged portion 22 of the bore formed in the hub structure 10–11.

By this means, any material relative longitudinal movement between the bushing 15 and pulley section 8 is effectively prevented.

The bushing 15 is made of Nylatron or Delrin. This material has a relatively low coefficient of friction with respect to the metal of the shaft 1. Accordingly, little, if any, lubrication would be required between the contacting surfaces. Adjustment of the pulley section 8, with respect to the pulley section 3, is effected smoothly and effectively.

In the present instance, the pulley 8 is shown as urged resiliently toward the left, as by a compression spring 23. The adjustment of the effective diameter is then effected by either urging the belt 9 toward the axis of the shaft 1, to urge section 8 rightward against the force of the spring 23, or else by relieving the tension on the belt 9 sufficiently to permit the spring 23 to act and to cause the section 8 to move into contact with the right-hand edge of the belt 9.

The left-hand end of the spring 28 acts against a shoulder 25, formed around the hub section 11. Ribs 26 are formed on the exterior hub 11 in order to provide a guide for the spring 23.

The right-hand end of the spring 23 engages the bottom of a cup 27, held by the spring 23 against the shoulder 28 formed on the shaft 1. This cup 27 serves as a guide for the right-hand portion of the spring 23.

Figure 5:
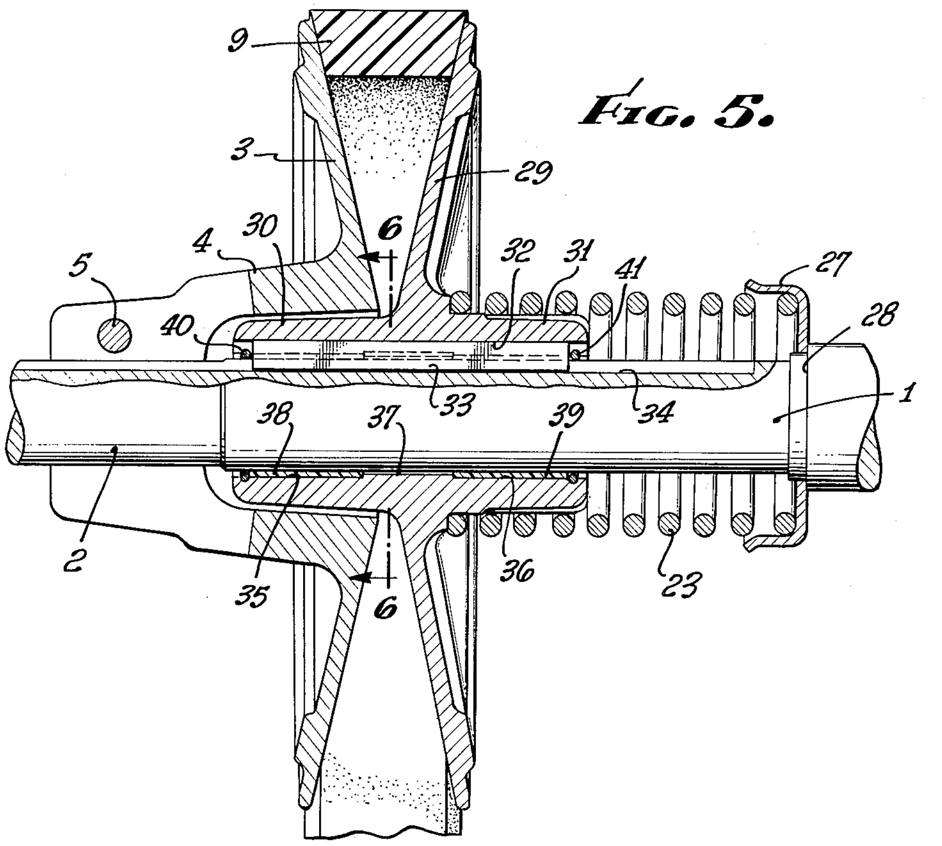
FIG. 5 is a view similar to FIG. 1 of a modified form of the invention.
Figure 6:
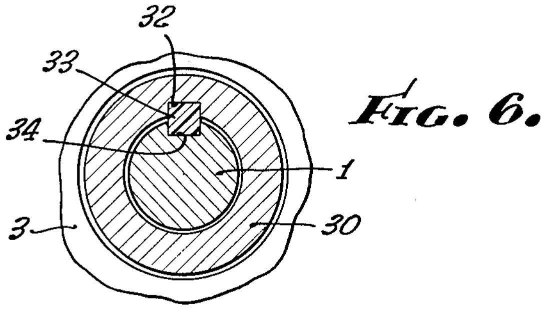
FIG. 6 is a sectional view, taken along a plane corresponding to line 6—6 of FIG. 5.
Figure 7:
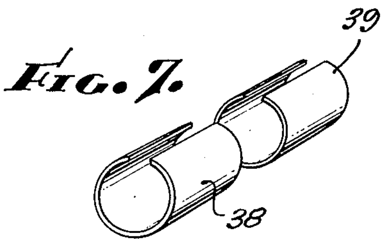
FIG. 7 is a pictorial view of a bushing structure utilized in the form of the invention shown in FIG. 5.

In the form of the invention illustrated in FIGS. 5, 6 and 7, the adjustable pulley section 29 is formed as before with hub sections 30 and 31. Pulley section 3 is rigidly attached to reduced section 2 of shaft 1.

Formed in the hub structure 31 is a keyway 32, in which is permanently seated a plastic key 33. This plastic key engages a keyway 34 in the shaft 1, providing a guide for the movement of the pulley section 29.

The hub sections 30 and 31 are each provided with bores 35 and 36, connected by a bore 37 of smaller diameter. The bore 37, as shown in FIG. 6, has a slight clearance with respect to the shaft 1. Abutting the shoulders formed respectively between the bores 35, 37 and 36 are plastic sleeves 38 and 39. These plastic sleeves are split end to end, as shown in FIG. 7, so as to permit passage of the key 33. They are made of the same material as bushing 15, heretofore described.

The ends of the hubs 30 and 31 extend beyond the ends of the sleeves 38 and 39, as shown most clearly in FIG. 5. In order to hold these bushings 38 and 39 in place, spring retainer rings 40 and 41 are utilized. These spring rings engage grooves formed in the interior surfaces of the hub sections 30 and 31. Accordingly, these spring rings prevent the bushings 38 and 39 from moving outwardly of the hubs from their positions in which they contact the shoulders formed by the bores 35, 36, 37.

In the form shown in FIGS. 8 to 11, inclusive, the shaft 1, pulley sections 3 and 8 and the edge-active belt 9 are identical to those disclosed in FIG. 1. A key 14 is intended to provide the driving means between the pulley sections and the shaft 1.

A bushing 42, made of sheet Teflon, is interposed between the shaft 1 and the hubs 30 and 31 of the pulley sections 3 and 8. This bushing 42 has a portion covering the keyway 43 and the shaft 1. The ends of the sheet are joined, and the bushing 42 may be joined to the shaft by adhesive bonding. The Teflon material can be wrapped around the shaft and the edges brought together underneath the key.

In this form of the invention, the shaft 1 can be made of ordinary steel, and the bushing 42 will protect the shaft against corrosion if operated in a humid atmosphere. The key 14 can also be made of metal.

As illustrated most clearly in FIG. 8, the bushing 42 is quite elongated so as to provide for the limits of travel of the pulley section 8 axially along the shaft 1.

In the form shown in FIGS. 12 and 13, the plastic bushing 44 is made in two parts **44*a* and 44*b*, and axially spaced. The adjacent ends have integral collars 45, 46 that are keyed into annular recesses 47, 48 in the hub 49 of the sliding member 50. The plastic or metal key 51 has enlarged ends interfitting slots 52 in the ends of the hub 49. Both bushing parts 44*a* and 44*b* are completely split longitudinally for the passage of the key 51 into the shaft keyway 53**.

The bushing is compressed so as to enable the collars 45 to enter the bore of hub 49 and snap into the recesses 47 and 48. The expanding force of the bushing parts **44*a* and 44*b*** keeps them in place.

After the bushing is thus assembled, the key 51 can be placed into the hub; and then the entire assembly may be mounted on shaft 1.

In the form shown in FIGS. 14 and 15, the bushing 54 is longitudinally split to pass the plastic or metal key 55 of straight form. The bushing is held in place in hub 56 by the spring rings 57 engaging in grooves formed in the interior of the hub near the ends thereof. These rings also confine the key 55 against axial movement with respect to hub 56.

In the form shown in FIGS. 16 and 17, the plastic bushing 57 is again longitudinally split to accommodate the plastic or metal key 58. By compressing the bushing as permitted by the slit, the bushing can be passed in the hub 59 to cause the end collars 60 to snap into place at the end faces of the hub 59.

In the forms shown in FIGS. 18 and 19, the plastic bushing 70 has a wide slit 61. At the central portion of the slit, integral projections 62 extend toward each other. These projections are received in a transverse slot 63 formed centrally of key 64. The key is thus of reduced thickness at this portion. The projections 62 thus key the bushing to the key 64.

In the form shown in FIGS. 20 and 21, the slitted plastic bushing 65 has a central enlargement or collar 66. This collar by compressing the bushing can be passed into hub 67 to engage the annular recess 68 in the hub. The key 69 has a thickened portion at its center, forming a projection that can extend into the slot in the collar 66.

The inventors claim:

1. In a drive structure: a sliding element mounted on a shaft for relative axial movement; a bushing interposed between the element and the shaft and having a longitudinal opening therein; a key carried by a mating recess in the sliding element, said key extending through said opening into a keyway in the shaft in which it is slidably movable; said bushing being longitudinally slit and the edges of the slit spaced, the bushing having one or more lugs turned outwardly from the slit at the central portion thereof, said lugs being accommodated within an enlarged bore of the element to retain the bushing within the element; said bushing and key made of the same or similar plastic material having a low coefficient of friction with respect to the shaft.

2. The combination as set forth in claim 1 in which the bushing at a place diametrically opposite said lugs has an opening therein with edges turned outwardly.

3. A bushing made from plastic material having a low coefficient of friction with respect to metal; said bushing being longitudinally split, the edges of the split being spaced; the split extending completely from end to end of the bushing; the bushing having pairs of lines of severance at an intermediate portion of each edge of the split, and transverse to the split, the material of the bushing between the lines being directed away from the edge; and the bushing, at a point diametrically opposite said lines, having similar lines to define a pair of outwardly directed extensions.

4. In a drive structure: a shaft; an element mounted on the shaft for relative axial movement thereof; a key mounted in a keyway formed in the shaft for transmitting motion between the shaft and the element, said key having lugs on its ends extending into mating recesses in said element to prevent relative rectilinear movement between said element and key; and a bushing overlying the shaft and the keyway, and made of a plastic that has a low coefficient of friction with respect to the element.

5. In a drive structure including a shaft, a sliding element mounted on the shaft for relative axial movement thereof, and a bushing between the element and the shaft and made of a plastic that has a low coefficient of friction with respect to the shaft, the combination therewith of a key or spline carried by a mating recess in the sliding element, said key or spline extending into and slidable in a keyway in the shaft, the bushing having axially separated parts, each longitudinally slit to permit passage of the key, each part having an integral collar at the adjacent ends, and extending into an appropriate recess in the sliding element, said bushing parts being compressible by virtue of the split, whereby when the bushing parts are assembled, the collars are urged into cooperative relation to the sliding element recesses.

6. In a drive structure including a shaft, a sliding element mounted on the shaft for relative axial movement thereof, and a bushing between the element and the shaft and made of a plastic that has a low coefficient of friction with respect to the shaft, the combination therewith of a key or spline carried by the sliding element, said key or spline extending into and slidable in a keyway in the shaft, the bushing being longitudinally split to accommodate the key; said key having a central portion of reduced thickness; and the bushing having projections extending inwardly from the split, extending over the narrowed portion.

7. In a drive structure including a shaft, a sliding element mounted on the shaft for relative axial movement thereof, and a bushing between the element and the shaft and made of a plastic that has a low coefficient of friction with respect to the shaft, the combination therewith of a key or spline carried by the sliding element, said key or spline extending into and slidable in a keyway in the shaft, the bushing being longitudinally split to accommodate the key; said key having a central portion of increased thickness received in an annular recess in the sliding member; and the bushing having a central portion of increased diameter fitting into said recess.

References Cited in the file of this patent

UNITED STATES PATENTS

| | | |
|---|---|---|
| 827,023 | Knoener | July 24, 1906 |
| 1,376,664 | Annable | May 3, 1921 |
| 2,120,383 | Watson | June 14, 1938 |
| 2,433,150 | Palm | Dec. 23, 1947 |
| 2,675,283 | Thomson | Apr. 13, 1954 |
| 2,812,666 | Huck | Nov. 12, 1957 |
| 2,846,251 | Herbenar | Aug. 5, 1958 |
| 2,852,951 | Miner | Sept. 23, 1958 |
| 2,937,042 | Wilder | May 17, 1960 |
| 3,009,363 | Kahn | Nov. 21, 1961 |

FOREIGN PATENTS

| | | |
|---|---|---|
| 778,816 | Great Britain | July 10, 1957 |